United States Patent
You et al.

(10) Patent No.: US 11,026,197 B2
(45) Date of Patent: Jun. 1, 2021

(54) COMMUNICATION METHOD AND DEVICE

(71) Applicant: Huawei Technologies Co., Ltd., Shenzhen (CN)

(72) Inventors: Xiaohu You, Nanjing (CN); Mao Wang, Nanjing (CN); Jun Zhang, Shenzhen (CN); Yalin Liu, Shanghai (CN); Hengjie Hu, Beijing (CN); Jun Zou, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 16/530,460

(22) Filed: Aug. 2, 2019

(65) Prior Publication Data
US 2019/0357162 A1 Nov. 21, 2019

Related U.S. Application Data

(63) Continuation of application No. PCT/CN2018/075146, filed on Feb. 2, 2018.

(30) Foreign Application Priority Data

Feb. 4, 2017 (CN) .......................... 201710064026.6

(51) Int. Cl.
*H04W 56/00* (2009.01)
*H04W 72/04* (2009.01)
*H04L 5/00* (2006.01)

(52) U.S. Cl.
CPC .......... *H04W 56/001* (2013.01); *H04L 5/001* (2013.01); *H04W 72/0453* (2013.01)

(58) Field of Classification Search
CPC .. H04W 72/0453; H04W 56/001; H04L 5/001
See application file for complete search history.

(56) References Cited

U.S. PATENT DOCUMENTS

2010/0246638 A1* 9/2010 Mehta .................. H04B 7/0691
375/133
2012/0082152 A1* 4/2012 Baldemair ........ H04W 56/0015
370/350
(Continued)

FOREIGN PATENT DOCUMENTS

| CN | 102098259 A | 6/2011 |
| CN | 102769477 A | 11/2012 |

(Continued)

OTHER PUBLICATIONS

Machine Translation and Abstract of Chinese Publication No. CN102098259, Jun. 15, 2011, 17 pages.
(Continued)

*Primary Examiner* — Phong La
(74) *Attorney, Agent, or Firm* — Conley Rose, P.C.

(57) ABSTRACT

A communication method includes: determining, by a first device, a first synchronization signal, where the first synchronization signal is used by a second device for symbol timing alignment and frequency synchronization; and sending, by the first device, the first synchronization signal on each group of subcarriers of M groups of subcarriers, where M is a positive integer greater than or equal to 2. According to the communication method in this application, the first device sends the first synchronization signal on each group of subcarriers of a plurality of groups of subcarriers, so that the second device can select, based on a reception capability of the second device, an appropriate bandwidth to receive the first synchronization signal.

20 Claims, 10 Drawing Sheets

(56) References Cited

U.S. PATENT DOCUMENTS

| | | | |
|---|---|---|---|
| 2012/0307821 A1* | 12/2012 | Kwon | H04W 76/27 370/350 |
| 2013/0188620 A1* | 7/2013 | Dinan | H04W 28/18 370/336 |
| 2013/0258957 A1* | 10/2013 | Dinan | H04W 52/146 370/329 |
| 2014/0082645 A1* | 3/2014 | Stern | H04N 21/44222 725/13 |
| 2014/0270030 A1* | 9/2014 | Hammad | H03L 7/1075 375/371 |
| 2015/0173034 A1* | 6/2015 | Rode | H04B 7/024 370/330 |
| 2015/0181546 A1* | 6/2015 | Freda | H04L 27/0014 370/336 |
| 2015/0327195 A1* | 11/2015 | Chiu | H04B 7/15507 370/350 |
| 2016/0014718 A1* | 1/2016 | Mysore Balasubramanya | H04W 52/0216 455/458 |
| 2016/0270015 A1* | 9/2016 | Lin | H04W 56/0015 |
| 2016/0374033 A1* | 12/2016 | Nogami | H04L 5/001 |
| 2017/0265155 A1* | 9/2017 | Kim | H04W 56/001 |
| 2017/0367059 A1* | 12/2017 | Park | H04W 76/14 |
| 2017/0373900 A1* | 12/2017 | Adhikary | H04W 56/0015 |
| 2018/0092101 A1* | 3/2018 | Xia | H04W 72/0453 |
| 2018/0176810 A1* | 6/2018 | Thangarasa | H04L 5/001 |
| 2018/0227848 A1* | 8/2018 | Lee | H04L 5/0091 |
| 2018/0270894 A1* | 9/2018 | Park | H04W 76/27 |
| 2018/0324807 A1* | 11/2018 | Liu | H04W 24/10 |
| 2019/0104549 A1* | 4/2019 | Deng | H04B 7/0617 |
| 2019/0289668 A1* | 9/2019 | He | H04L 5/0098 |
| 2020/0053672 A1* | 2/2020 | Tang | H04W 72/0453 |
| 2020/0053673 A1* | 2/2020 | Reial | H04L 27/2671 |
| 2020/0053675 A1* | 2/2020 | Khoryaev | H04W 56/002 |

FOREIGN PATENT DOCUMENTS

| | | |
|---|---|---|
| CN | 103378882 A | 10/2013 |
| WO | 2014153777 A1 | 10/2014 |

OTHER PUBLICATIONS

Machine Translation and Abstract of Chinese Publication No. CN102769477, Nov. 7, 2012, 15 pages.

"3rd Generation Partnership Project; Technical Specification Group Radio Access Network; Evolved Universal Terrestrial Radio Access (E-UTRA); Physical channels and modulation (Release 13)," 3GPP TS 36.211, V13.0.0, Dec. 2015, Dec. 2015, 141 pages.

Dong, L., et al., "Design and Implementation of the Synchronization Signal Based for Multi-user Broadband Power Line Communications," Proceedings of the CSEE, vol. 34 No. 1, Jan. 5, 2014, pp. 197-205.

English Translation of Dong, L., et al., "Design and Implementation of the Synchronization Signal Based for Multi-user Broadband Power Line Communications," Proceedings of the CSEE, vol. 34 No. 1, Jan. 5, 2014, 8 pages.

Foreign Communication From a Counterpart Application, PCT Application No. PCT/CN2018/075146, English Translation of International Search Report dated May 4, 2018, 2 pages.

Foreign Communication From a Counterpart Application, PCT Application No. PCT/CN2018/075146, English Translation of Written Opinion dated May 4, 2018, 5 pages.

* cited by examiner

COMMUNICATION METHOD AND DEVICE

CROSS-REFERENCE TO RELATED APPLICATIONS

This is a continuation of Int'l Patent App. No. PCT/CN2018/075146 filed on Feb. 2, 2018, which claims priority to Chinese Patent App. No. 201710064026.6 filed on Feb. 4, 2017, which are incorporated by reference.

TECHNICAL FIELD

This disclosure relates to the communications field, and more specifically, to a communication method and a device.

BACKGROUND

Basic functions of a smart power grid are power distribution automation, electricity consumption data collection automation, monitoring of key nodes on the power grid, and accident prevention implemented through real-time data feedback (for example, a major blackout). With development of new-energy power generation technologies, the power grid will change the status quo in which only power plants supply power. Every household may generate electricity, and transfer electricity to each other on demand, to implement flexible electricity distribution and transfer. Such a novel transmission structure relies more on sufficient information exchange between nodes on the power grid. Because the smart grid relies on sufficient power system information exchange between the nodes on the power grid, power system information exchange becomes a key technology of the smart grid.

If power system information exchange is handed over to an operator, that is, implementing power communication by using a public network, economic costs are high in a long term, and a potential trouble is laid for power system security. Therefore, building a power dedicated network is imperative. The State Electricity Regulatory Commission decree No. 34 expressly stipulates that among remote communication, telemetry, and remote control operations performed by a power device, the remote control operations need to be performed by using a power dedicated network, and a public network must not be used, to avoid a safety accident caused by information leakage. Building the power dedicated network by using an optical fiber communications technology costs high and cannot be implemented. A mature wireless communications system, as a flexible deployment solution, becomes an important means of building a power dedicated network. Building a power dedicated network based on a wireless communications system means that a power enterprise itself builds base stations to create its own wireless network. A power dedicated network built based on a wireless communications system is referred to as a power wireless dedicated network or a power wireless communications system.

Therefore, a communication method that can support a power wireless communications system needs to be provided, to implement information exchange in the power wireless communications system.

SUMMARY

Embodiments provide a communication method and a device, so as to support a power wireless communications system and implement information exchange in the power wireless communications system.

According to a first aspect, a communication method is provided, including: determining, by a first device, a first synchronization signal, where the first synchronization signal is used by a second device for symbol timing alignment and frequency synchronization; and sending, by the first device, the first synchronization signal on each group of subcarriers of M groups of subcarriers, where M is a positive integer greater than or equal to 2.

According to the communication method, the first device sends the first synchronization signal on each group of subcarriers of a plurality of groups of subcarriers, so that the second device can select, based on a reception capability of the second device, an appropriate bandwidth to receive the first synchronization signal. In this way, a device with wideband reception performance and a device with narrowband reception performance can be supported. In addition, the first device sends a plurality of first synchronization signals to the second device on the plurality of groups of subcarriers, so that interference diversity and frequency domain diversity can be provided, and first synchronization signal transmission reliability can be improved.

In this embodiment, each group of subcarriers may be a plurality of consecutive subcarriers, or may be a plurality of inconsecutive subcarriers. For example, each group of subcarriers may be 12 consecutive subcarriers included in a resource block (RB) in a power wireless communications system.

With reference to the first aspect, in an implementation of the first aspect, the sending, by the first device, the first synchronization signal on each group of subcarriers of M groups of subcarriers includes: sending, by the first device on each group of subcarriers of the M groups of subcarriers, the first synchronization signal to devices in all cells served by the first device, where the devices in all the cells include the second device.

In other words, the first device sends the first synchronization signal to the second device by using a single-frequency network (SFN) technology, to prevent a neighboring cell from interfering with a first synchronization signal of a current cell.

With reference to the first aspect and the foregoing implementation of the first aspect, in another implementation of the first aspect, the determining, by a first device, a first synchronization signal includes: determining, by the first device, N first complete sequences with a length being L, where a value of N is a quantity of orthogonal frequency division multiplexing OFDM symbols included in time domain resources used by the first device to send the first synchronization signal, and L is a prime number less than or equal to a quantity of subcarriers in each group of subcarriers; generating, by the first device, an $i^{th}$ OFDM symbol based on an $i^{th}$ first complete sequence, where i=1, 2, . . . , or N; and combining, by the first device, N OFDM symbols into the first synchronization signal.

Optionally, the first complete sequence is a Zadoff-Chu (ZC) sequence.

Therefore, when the second device needs to perform segmentation-related processing on the first synchronization signal, a correlation advantage of the first complete sequence can be maintained.

With reference to the first aspect and the foregoing implementations of the first aspect, in another implementation of the first aspect, before the sending, by the first device, the first synchronization signal on each group of subcarriers of M groups of subcarriers, the method further includes: performing, by the first device, precoding processing on the first synchronization signal, to obtain a precoded first synchronization signal, where precoding matrices used by the N OFDM symbols are not exactly the same.

Because precoding processing is performed on the first synchronization signal, space diversity can be obtained in a sending process, thereby improving anti-fading performance of the first synchronization signal.

With reference to the first aspect and the foregoing implementations of the first aspect, in another implementation of the first aspect, the method further includes: determining, by the first device, a second synchronization signal, where the second synchronization signal is used by the second device for frame timing alignment; and sending, by the first device, the second synchronization signal on each group of subcarriers of K groups of subcarriers, where K is a positive integer greater than or equal to 2.

Therefore, the first device sends the second synchronization signal to the second device on each group of subcarriers of a plurality of groups of subcarriers, so that frequency domain diversity and interference diversity can be provided, and first synchronization signal transmission reliability can be improved.

Optionally, each group of subcarriers of the K groups of subcarriers includes 12 valid subcarriers in a power wireless communications system, and a value of K is 40. In other words, the first device may send the second synchronization signal to the second device on 40 power-dedicated frequency points in a power system, so that high-precision timing of the second device can be implemented.

With reference to the first aspect and the foregoing implementations of the first aspect, in another implementation of the first aspect, the second synchronization signal is further used to indicate a physical cell identifier PCI of a current cell.

With reference to the first aspect and the foregoing implementations of the first aspect, in another implementation of the first aspect, the second synchronization signal includes first PCI information and second PCI information, the first PCI information is used to indicate a first value, the second PCI information is used to indicate a second value, and the method further includes: determining, by the first device, the first PCI information and the second PCI information based on a preset value combination rule and the PCI of the current cell.

In this way, searching complexity of the second device can be reduced.

With reference to the first aspect and the foregoing implementations of the first aspect, in another implementation of the first aspect, the determining, by the first device, a second synchronization signal includes: determining, by the first device, n second complete sequences with a length being l, where a value of n is a quantity of OFDM symbols included in time domain resources used by the first device to send the second synchronization signal, and l is a prime number less than or equal to a quantity of subcarriers in each group of subcarriers; generating, by the first device, a $j^{th}$ OFDM symbol based on a $j^{th}$ second complete sequence, where j=1, 2, . . . , or n; and combining, by the first device, n OFDM symbols into the second synchronization signal.

Optionally, the second complete sequence is a ZC sequence.

Therefore, when the second device needs to perform segmentation-related processing on the second synchronization signal, a correlation advantage of the second complete sequence can be maintained.

With reference to the first aspect and the foregoing implementations of the first aspect, in another implementation of the first aspect, before the sending, by the first device, the second synchronization signal on each group of subcarriers of K groups of subcarriers, the method further includes: performing, by the first device, precoding processing on the second synchronization signal, to obtain a precoded second synchronization signal, where precoding matrices used by OFDM symbols included in the second synchronization signal are not exactly the same.

Because precoding processing is performed on the second synchronization signal, an anti-fading capability of the second synchronization signal can be improved, thereby improving second synchronization signal transmission reliability.

With reference to the first aspect and the foregoing implementations of the first aspect, in another implementation of the first aspect, before the sending, by the first device, the second synchronization signal on each group of subcarriers of K groups of subcarriers, the method further includes: performing, by the first device, scrambling processing on the second synchronization signal, to obtain a scrambled second synchronization signal.

Because scrambling processing is performed on the second synchronization signal, a peak-to-average power ratio (PAPR) of the second synchronization signal can be reduced, thereby improving anti-interference performance.

With reference to the first aspect and the foregoing implementations of the first aspect, in another implementation of the first aspect, the method further includes: determining, by the first device, a broadcast signal; and sending, by the first device, the broadcast signal on each group of carriers of P groups of subcarriers, where P is a positive integer greater than or equal to 2.

Therefore, the first device sends the broadcast signal to the second device on each group of subcarriers of a plurality of groups of subcarriers, so that interference diversity and frequency domain diversity can be provided, and broadcast signal transmission reliability can be improved.

Optionally, transmission resources used by the first device to send the broadcast signal and transmission resources used by the first device to send the first synchronization signal include same frequency domain resources in frequency domain.

According to a second aspect, a communication method is provided, including: determining, by a second device, m groups of subcarriers that are of M groups of subcarriers and that are used to receive a first synchronization signal sent by a first device, where the first synchronization signal is used by the second device for symbol timing alignment and frequency synchronization, M is a positive integer greater than or equal to 2, and m is a positive integer less than M; and receiving, by the second device, the first synchronization signal on each group of subcarriers of the m groups of subcarriers.

According to the communication method, the second device selects subcarriers used to receive the first synchronization signal from a plurality of groups of subcarriers used by the first device to send the first synchronization signal. In this way, the second device may receive the first synchronization signal on a relatively narrow bandwidth, to avoid an impact of time drift on the first synchronization signal, and a device with only a narrowband reception capability can be supported.

With reference to the second aspect, in an implementation of the second aspect, the M groups of subcarriers are subcarriers used by the first device to send the first synchronization signal to devices in all cells served by the first device, and the devices in all the cells include the second device.

With reference to the second aspect and the foregoing implementation of the second aspect, in another implementation of the second aspect, the first synchronization signal is combined into by N orthogonal frequency division multiplexing OFDM symbols, an $i^{th}$ OFDM symbol among the N OFDM symbols is generated by the first device based on an $i^{th}$ first complete sequence with a length being L, a value of N is a quantity of OFDM symbols included in time domain resources used by the first device to send the first synchronization signal, L is a prime number less than or equal to a quantity of subcarriers in each group of subcarriers, and i=1, 2, . . . , or N.

With reference to the second aspect and the foregoing implementations of the second aspect, in another implementation of the second aspect, the first synchronization signal has been precoded by the first device, and precoding matrices used by OFDM symbols included in the first synchronization signal are not exactly the same.

With reference to the second aspect and the foregoing implementations of the second aspect, in another implementation of the second aspect, after the second device performs symbol timing alignment and frequency synchronization based on the first synchronization signal, the method further includes: receiving, by the second device on each group of subcarriers of K groups of subcarriers, a second synchronization signal sent by the first device, where K is a positive integer greater than or equal to 2.

In this way, the second device receives the second synchronization signal on a plurality of groups of subcarriers, and therefore the second device can obtain a high-precision timing effect based on phase information of different subcarriers (available subcarriers).

With reference to the second aspect and the foregoing implementations of the second aspect, in another implementation of the second aspect, the K groups of subcarriers include the m groups of subcarriers; and the receiving, by the second device on each group of subcarriers of K groups of subcarriers, a second synchronization signal sent by the first device includes: receiving, by the second device on each group of subcarriers of the m groups of subcarriers, the second synchronization signal sent by the first device.

In this way, the second device can receive the second synchronization signal only on subcarriers used to receive the first synchronization signal, and can support a device with only a narrowband reception function.

With reference to the second aspect and the foregoing implementations of the second aspect, in another implementation of the second aspect, the second synchronization signal is used to indicate a physical cell identifier PCI of a current cell, and the method further includes: determining, by the second device, the PCI of the current cell based on the second synchronization signal.

With reference to the second aspect and the foregoing implementations of the second aspect, in another implementation of the second aspect, the second synchronization signal includes first PCI information and second PCI information, the first PCI information is used to indicate a first value, and the second PCI information is used to indicate a second value; and the determining, by the second device, the PCI of the current cell based on the second synchronization signal includes: determining, by the second device, the PCI of the current cell based on a preset value combination rule and the first value and the second value.

With reference to the second aspect and the foregoing implementations of the second aspect, in another implementation of the second aspect, the second synchronization signal includes n OFDM symbols, a $j^{th}$ OFDM symbol among the n OFDM symbols is generated by the first device based on a $j^{th}$ second complete sequence with a length being l, a value of n is a quantity of OFDM symbols included in time domain resources used by the first device to send the second synchronization signal, l is a prime number less than or equal to a quantity of subcarriers included in each group of subcarriers, and j=1, 2, . . . , or n.

With reference to the second aspect and the foregoing implementations of the second aspect, in another implementation of the second aspect, the second synchronization signal has been precoded by the first device, and precoding matrices used by OFDM symbols included in the second synchronization signal are not exactly the same.

With reference to the second aspect and the foregoing implementations of the second aspect, in another implementation of the second aspect, the second synchronization signal has been scrambled by the first device.

With reference to the second aspect and the foregoing implementations of the second aspect, in another implementation of the second aspect, after the second device performs frame timing alignment based on the second synchronization signal, the method further includes: receiving, by the second device, a broadcast signal on each group of subcarriers of P groups of subcarriers, where P is a positive integer greater than or equal to 2.

With reference to the second aspect and the foregoing implementations of the second aspect, in another implementation of the second aspect, the P groups of subcarriers include the m groups of subcarriers, and the receiving, by the second device, a broadcast signal on each group of subcarriers of P groups of subcarriers includes: receiving, by the second device, the broadcast signal on the m groups of subcarriers.

In this way, the second device can receive the second synchronization signal only on subcarriers used to receive the first synchronization signal, and can support a device with only a narrowband reception function.

According to a third aspect, a device is provided, and is configured to perform the method in the first aspect or any possible implementation of the first aspect. Specifically, the device includes a functional module configured to perform the method in the first aspect or any possible implementation of the first aspect.

According to a fourth aspect, a device is provided, and is configured to perform the method in the second aspect or any possible implementation of the second aspect. Specifically, the device includes a functional module configured to perform the method in the second aspect or any possible implementation of the second aspect.

According to a fifth aspect, a device is provided, and includes a processor, a memory, and a transceiver. The processor, the memory, and the transceiver communicate with each other by using an internal connection channel, to transfer a control and/or data signal, so that the device performs the method in the first aspect or any possible implementation of the first aspect.

According to a sixth aspect, a device is provided, and includes a processor, a memory, and a transceiver. The processor, the memory, and the transceiver communicate with each other by using an internal connection channel, to transfer a control and/or data signal, so that the device performs the method in the second aspect or any possible implementation of the second aspect.

According to a seventh aspect, a computer readable medium is provided, and is configured to store a computer program. The computer program includes an instruction used to perform the method in the first aspect or any possible implementation of the first aspect.

According to an eighth aspect, a computer readable medium is provided, and is configured to store a computer program. The computer program includes an instruction used to perform the method in the second aspect or any possible implementation of the second aspect.

DESCRIPTION OF EMBODIMENTS

The following describes technical solutions of embodiments with reference to accompanying drawings.

A communication method in the embodiments may be applied to an Internet of Things system, including but not limited to a power wireless communications system. In the Internet of Things system, some devices need to be deployed on a large scale, and a low-cost narrowband transceiver is usually selected for these devices. Therefore, a conventional wireless communication mechanism cannot be used to implement information exchange in the system.

To address the foregoing technical problem, this disclosure provides a communication method and device, which can support a plurality of communications systems and implement information exchange.

It should be noted that the communication method is used as an example in the following to describe a power wireless communications system in the embodiments. This is intended for ease of description only, and does not limit the disclosure.

Figure 1:
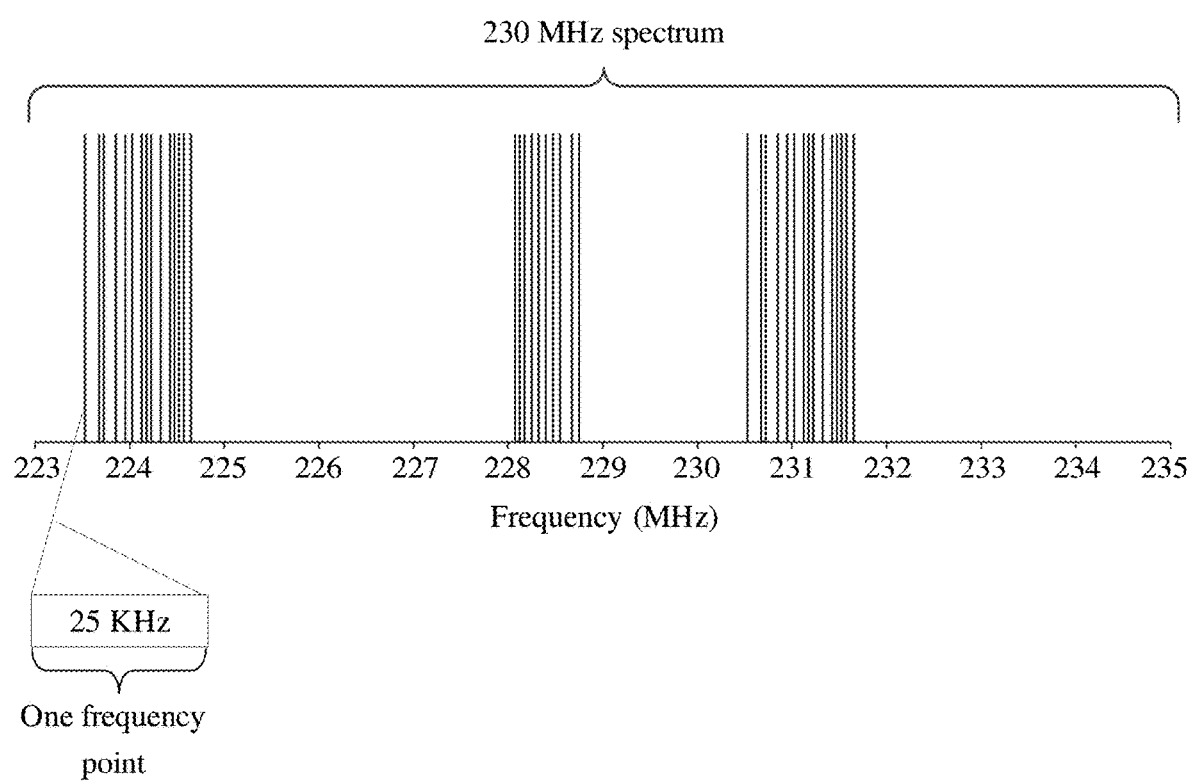
FIG. 1 is a schematic diagram of spectrum transmission resources in a power wireless communications system according to an embodiment.

FIG. 1 shows spectrum transmission resources in a power wireless communications system according to an embodiment. As shown in FIG. 1, a spectrum range of a 230 megahertz (MHz) frequency band is 223.025 MHz to 235 MHz (11.975 MHz). This spectrum section is divided by using a bandwidth of 25 kilohertz (kHz) as a frequency point, and there are totally 480 frequency points. A start frequency point of the 480 frequency points is 223.025 MHz, and an end frequency point is 235 MHz. The 480 frequency points totally occupy a bandwidth of 12 MHz (235 MHz−223.025 MHz+25 kHz=12 MHz). 40 frequency points of the 480 frequency points in a spectrum of the 230 MHz frequency band are allocated as dedicated frequency points of the power wireless communications system. The 40 dedicated frequency points (totally 1 MHz) of the power wireless communications system are scattered among the 480 frequency points. Each vertical line in FIG. 1 represents a frequency point in the power wireless communications system.

Specifically, the 40 dedicated frequency points of the power wireless communications system are shown in Table 1 and Table 2.

TABLE 1

| Category | Frequency group | Frequency code | Transmit frequency (MHz) |
|---|---|---|---|
| Single-frequency networking | F1 | F1-3 | 228.075 |
| | | F1-5 | 228.125 |
| | | F1-7 | 228.175 |
| | | F1-10 | 228.250 |
| | | F1-13 | 228.325 |
| | | F1-16 | 228.400 |
| | | F1-19 | 228.475 |
| | | F1-22 | 228.550 |
| | | F1-27 | 228.675 |
| | | F1-30 | 228.750 |

TABLE 2

| | | | Transmit frequency (MHz) | |
|---|---|---|---|---|
| Category | Frequency group | Frequency code | Master station | Subordinate station |
| Dual-frequency networking | F3 | F3-21 | 230.525 | 223.525 |
| | | F3-27 | 230.675 | 223.675 |
| | | F3-29 | 230.725 | 223.725 |
| | | F3-34 | 230.850 | 223.850 |
| | | F3-38 | 230.950 | 223.950 |
| | | F3-41 | 231.025 | 224.025 |
| | | F3-45 | 231.125 | 224.125 |
| | | F3-47 | 231.175 | 224.175 |
| | | F3-49 | 231.225 | 224.225 |
| | F4 | F4-3 | 231.325 | 224.325 |
| | | F4-7 | 231.425 | 224.425 |
| | | F4-9 | 231.475 | 224.475 |
| | | F4-11 | 231.525 | 224.525 |
| | | F4-13 | 231.575 | 224.575 |
| | | F4-16 | 231.650 | 224.650 |

In addition, as shown in FIG. 1, a start frequency point of a dedicated frequency band of the power wireless communications system in the spectrum of the 230 MHz frequency band is 8.150 MHz (8.125 MHz+25 kHz=8.150 MHz) away from an end frequency point. One frequency point of 25 kHz is used as a bandwidth of an RB. Each RB is divided into 16 subcarriers. 8.150 MHz is corresponding to 5216 subcarriers (16×(8.150 MHz/25 kHz)=5216). A total bandwidth of the 40 available frequency points of the power wireless communications system is 1 MHz, corresponding to 640 available subcarriers.

Figure 2:
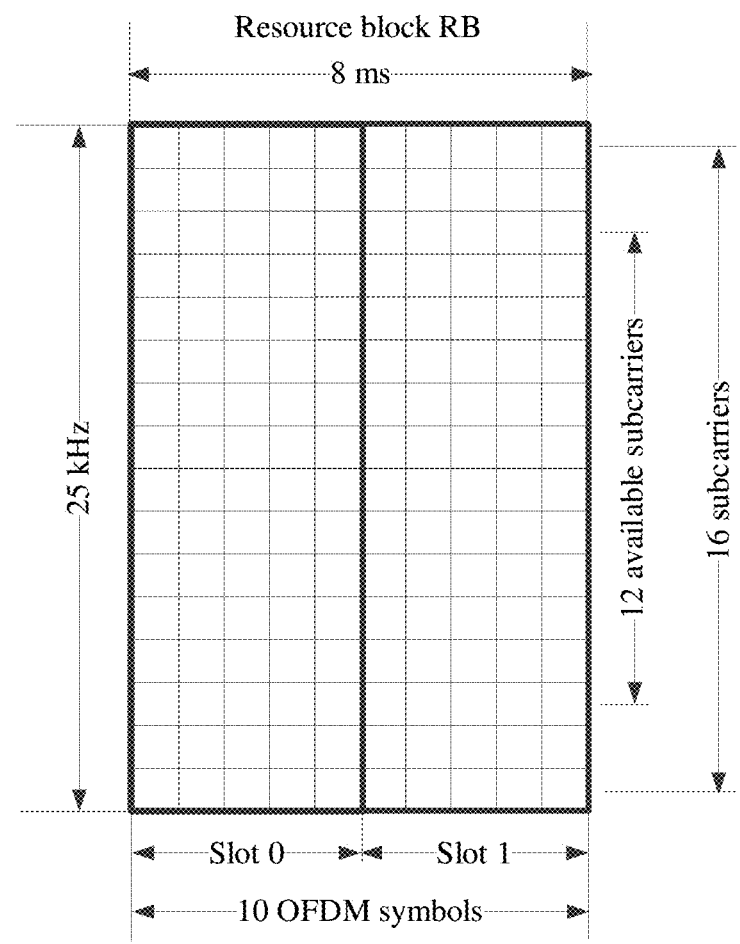
FIG. 2 is a schematic diagram of a basic transmission unit in a power wireless communications system according to an embodiment.

Specifically, FIG. 2 shows a basic transmission unit (that is, an RB) according to an embodiment. In frequency domain, the RB occupies a frequency point (25 kHz) and includes 16 subcarriers. In other words, a subcarrier gap is 1.5625 kHz. In time domain, the RB occupies 8 milliseconds (ms) and includes two slots. Each slot includes five orthogonal frequency-division multiplexing (OFDM) symbols. In addition, one subcarrier in frequency domain and one OFDM symbol in time domain constitute one resource element (RE).

Usually, considering that a delay spread of a 100 km cell is 17 microseconds (μs) and timing precision of a narrow-band device (25 kHz) is ±40 μm, a length of a cyclic prefix (CP) of each OFDM symbol is set to 120 μs. On a basis of 120 μs, 200 μs is added to a CP of a first OFDM symbol in each slot, to provide the narrowband device with time required for frequency modulation.

Figure 3:
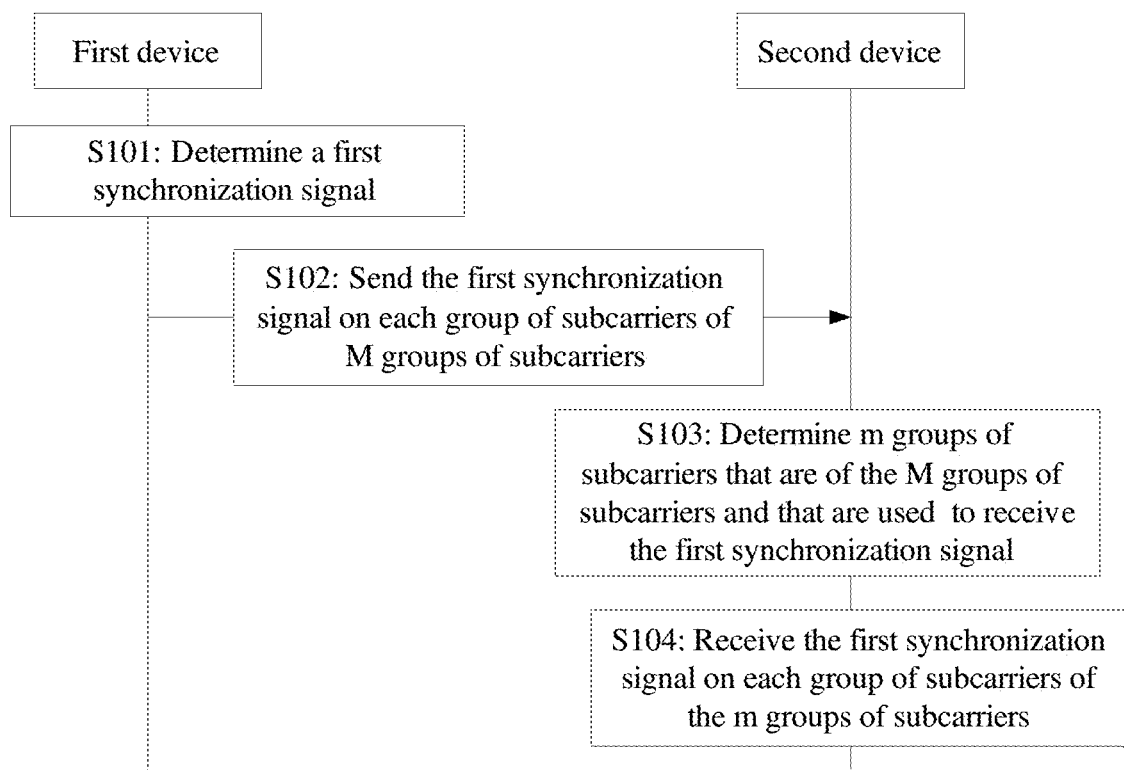
FIG. 3 is a schematic flowchart of a communication method according to an embodiment.

The following describes a communication method according to an embodiment in detail with reference to FIG. 1 and FIG. 2. It should be noted that in this embodiment, a first device is, for example, a base station, and a second device is, for example, a terminal device. As shown in FIG. 3, a method 100 includes the following steps.

S101: A first device determines a first synchronization signal, where the first synchronization signal is used by a second device for symbol timing alignment and frequency synchronization.

It should be noted that the first synchronization signal in S101 may be corresponding to a primary synchronization signal (PSS) in an existing Long-Term Evolution (LTE) system, and the first synchronization signal is used by the second device to overcome time and frequency uncertainty and implement rough synchronization.

S102: The first device sends the first synchronization signal on each group of subcarriers of M groups of subcarriers, where M is a positive integer greater than or equal to 2.

Optionally, in S102, each group of subcarriers may be a plurality of consecutive subcarriers, or may be a plurality of inconsecutive subcarriers. For example, when the first device and the second device are devices in a power wireless communications system, each group of subcarriers includes 12 consecutive subcarriers, or it may be considered that each group of subcarriers includes 16 consecutive subcarriers, and 12 of the 16 consecutive subcarriers are available subcarriers.

In other words, for the power wireless communications system, the first device sends the first synchronization signal on each of M frequency points, and totally sends M first synchronization signals. Optionally, the M frequency points may be a plurality of frequency points evenly scattered in frequency domain. For example, the M frequency points may be frequency points 0, 5, 10, 15, 20, 25, 30, and 35 among dedicated frequency points of the power wireless communications system. Because the first device sends the first synchronization signal on a plurality of frequency points, interference diversity and frequency domain diversity can be provided.

Further, in some embodiments, the first synchronization signal does not carry physical cell identifier (PCI) information, and the first device sends the first synchronization signal by using an SFN technology. Because all cells use a same waveform, interference caused by a neighboring cell to a first synchronization signal of a current cell can be avoided.

Specifically, in some embodiments, the first device determines, based on parameters such as a resource size of a subframe, a requirement for a coverage radius of a cell, and transmit power of the first device, time domain resources used to send the first synchronization signal. For example, the time domain resources used to send the first synchronization signal may be partial resources of a subframe, or may be resources of one or more subframes.

Figure 4:
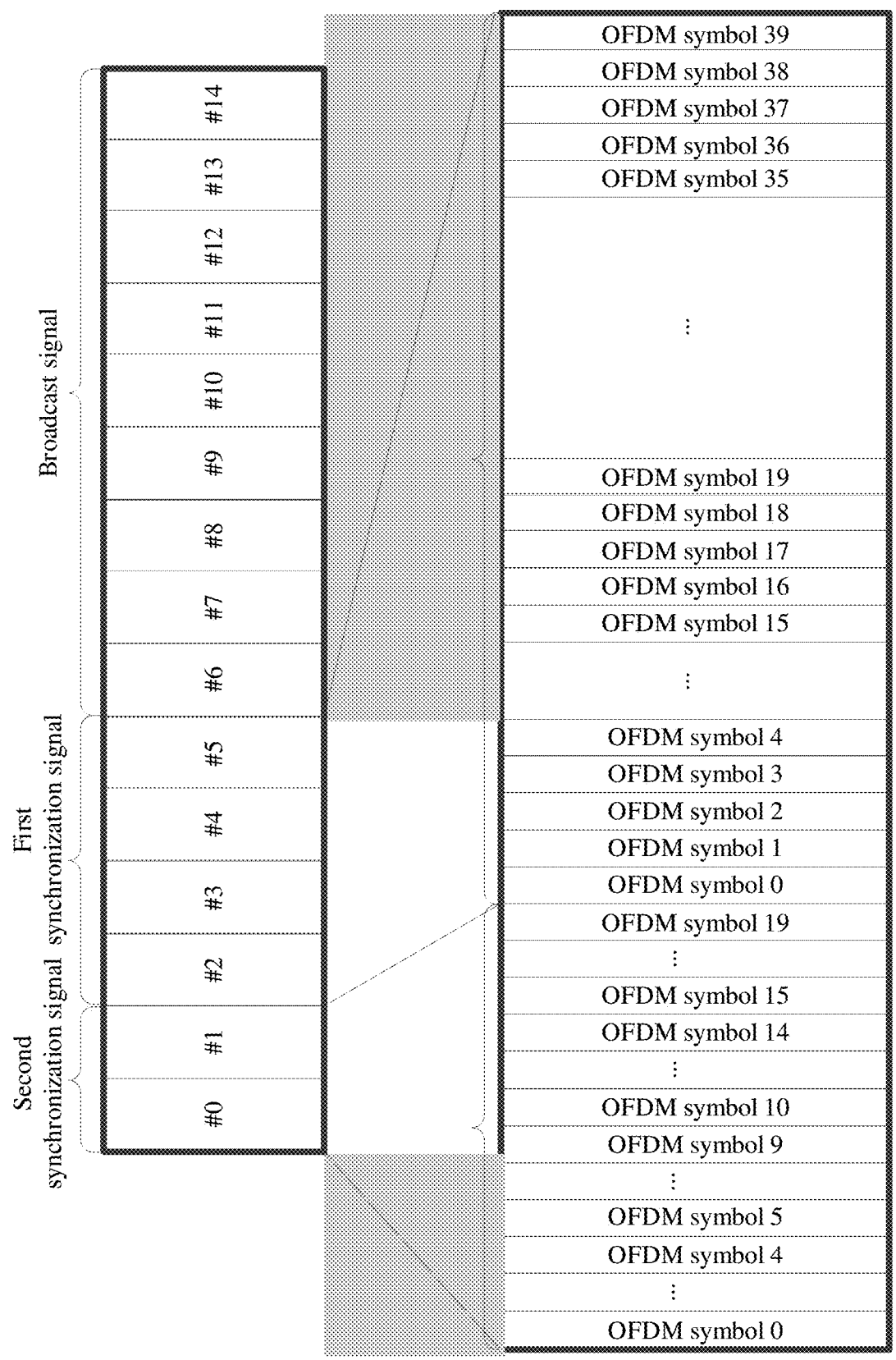
FIG. 4 is a schematic diagram of time domain resources according to an embodiment.

For example, as shown in FIG. 4, the time domain resources used to send the first synchronization signal include four subframes (subframes #2, #3, #4, and #5) in one special radio frame, 40 OFDM symbols totally.

In some embodiments, different from that the PSS in the existing LTE system uses a ZC sequence with a length being 63, the first synchronization signal uses a short ZC sequence, so that a receive-end device can maintain an advantage of autocorrelation performance when performing segmentation processing.

In this embodiment, there are 12 available subcarriers in a frequency point in the power wireless communications system. Therefore, each of OFDM symbols that form the first synchronization signal may be generated in frequency domain based on a ZC sequence with a length being a prime number less than 12. For example, each OFDM symbol is generated in frequency domain based on a ZC sequence with a length being 11. An OFDM symbol may be generated according to a formula (1).

$$r_l(n) = e^{-j\pi \mu_l n(n+1)/N_{ZC}} \quad (1)$$

In the formula (1), $r_l(n)$ represents an OFDM symbol numbered $l$, $l=0, 1, 2, \ldots,$ or 39, $n=0, 1, 2, \ldots,$ or $N_{FFT}-1$, $N_{FFT}$ is a fast Fourier transform (FFT) value, and $N_{ZC}$ is a length of a ZC sequence. Correspondences between $l$ and $\mu_l$ are shown in Table 3.

TABLE 3

| l | $\mu_l$ |
|---|---|
| 0 | 10 |
| 1 | 8 |
| 2 | 7 |
| 3 | 4 |
| 4 | 2 |
| 5 | 6 |
| 6 | 1 |
| 7 | 3 |
| 8 | 9 |
| 9 | 5 |
| 10 | 1 |
| 11 | 5 |
| 12 | 10 |
| 13 | 6 |
| 14 | 8 |
| 15 | 4 |
| 16 | 2 |
| 17 | 7 |
| 18 | 3 |
| 19 | 9 |
| 20 | 2 |
| 21 | 8 |
| 22 | 9 |
| 23 | 7 |
| 24 | 6 |
| 25 | 5 |
| 26 | 3 |
| 27 | 10 |
| 28 | 4 |
| 29 | 1 |
| 30 | 5 |
| 31 | 7 |
| 32 | 3 |
| 33 | 8 |
| 34 | 2 |
| 35 | 1 |
| 36 | 4 |
| 37 | 10 |
| 38 | 6 |
| 39 | 9 |

Further, before sending the first synchronization signal, the first device performs precoding processing on the first synchronization signal, for example, performing orthogonal precoding processing, so that when the first synchronization signal is sent, space diversity can be obtained, and anti-fading performance can be improved.

For example, it is assumed that the first device has two antennas, and first 20 OFDM symbols and last 20 OFDM symbols of the first synchronization signal use orthogonal precoding. In this case, corresponding precoding matrices are $$\frac{1}{\sqrt{2}}[1 \ 1]^T \text{ and } \frac{1}{\sqrt{2}}[1 \ -1]^T,$$

respectively.

S103: The second device determines m groups of subcarriers that are of the M groups of subcarriers and that are used to receive the first synchronization signal sent by the first device, where M is a positive integer greater than or equal to 2, and m is a positive integer less than M.

It should be noted that although the first device sends the first synchronization signal on each group of subcarriers of a plurality of groups of subcarriers, the second device may receive the first synchronization signal on some subcarriers of the M groups of subcarriers, to obtain relatively better detection performance. In this way, a terminal with a narrowband reception function can successfully receive the first synchronization signal.

Optionally, in some embodiments, the second device receives the first synchronization signal only on one group of subcarriers. For example, the second device receives the first synchronization signal on a single frequency point in the power wireless communications system. Specifically, information about a frequency point used by the first device to send the first synchronization signal may be preconfigured on the second device, and the second device selects, based on the preconfigured frequency point information, a frequency point from a plurality of frequency points used by the first device to send the first synchronization signal, and receives the first synchronization signal on the selected frequency point.

In addition, when selecting a frequency point used to receive the first synchronization signal, the second device may randomly select a frequency point. If the second device does not find the first synchronization signal on the selected frequency point, the second device may randomly select another frequency point until the first synchronization signal is found. Alternatively, when determining, for a first time, a frequency point used to receive the first synchronization signal, the second device may select a frequency point that is nearest to a center frequency point. If the second device does not find the first synchronization signal on the selected frequency point, the second device may select, along a preset selection direction, a next frequency point that is relatively far away from the center frequency point until the first synchronization signal is found.

The second device may receive the first synchronization signal on some frequency points (or even on one frequency point). Therefore, the first device may send the first synchronization signal at a long transmission time interval (TTI), to implement wide coverage of the first synchronization signal.

S104: The second device receives the first synchronization signal on each group of subcarriers of the m groups of subcarriers.

Figure 5:
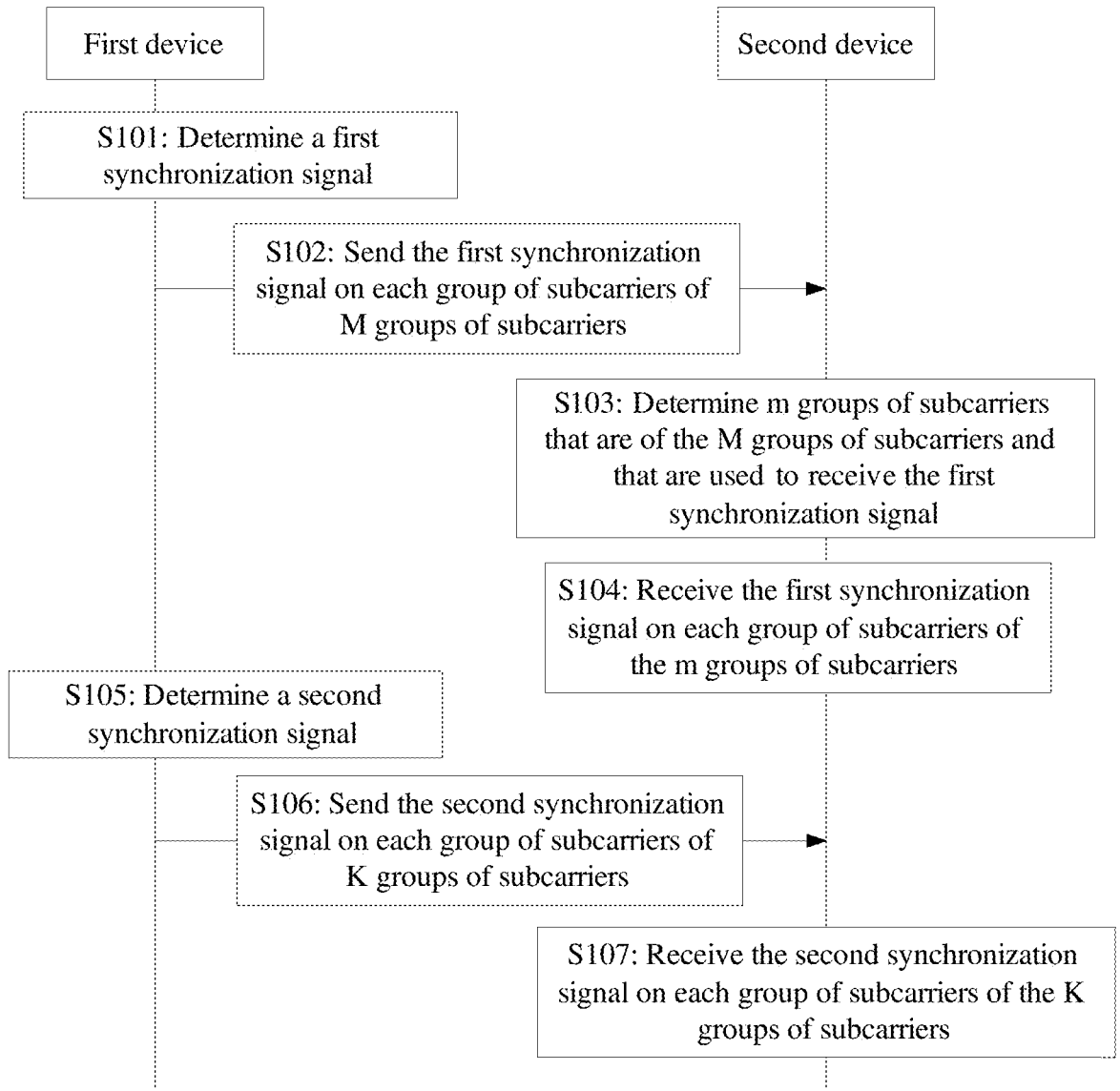
FIG. 5 is another schematic flowchart of a communication method according to an embodiment.

In this embodiment, further, as shown in FIG. 5, the method 100 further includes the following steps.

S105: The first device determines a second synchronization signal, where the second synchronization signal is used by the second device for frame timing alignment.

It should be noted that the second synchronization signal in S105 may be corresponding to a secondary synchronization signal (SSS) in the existing LTE system, and the second synchronization signal is used by the second device for precise timing.

S106: The first device sends the second synchronization signal on each group of subcarriers of K groups of subcarriers, where K is a positive integer greater than or equal to 2.

Optionally, in S106, each group of subcarriers is corresponding to a frequency point in the power wireless communications system. In other words, the first device sends the second synchronization signal on each of K frequency points, and totally sends K second synchronization signals. Optionally, the first device may send the second synchronization signal on each of 40 frequency points of the power wireless communications system. In this case, interference diversity and frequency domain diversity can be provided, and the second device can obtain a high-precision timing effect based on phase information of subcarriers (that is, available subcarriers) of scattered frequency points.

Specifically, in some embodiments, the first device determines, based on parameters such as a resource size of a subframe, a requirement for a coverage radius of a cell, and transmit power of the first device, time domain resources used to send the second synchronization signal. For example, the time domain resources used to send the second synchronization signal may be partial resources of a subframe, or may be resources of one or more subframes.

For example, as shown in FIG. 4, the time domain resources used to send the second synchronization signal include two subframes (subframes #0 and #1) in one radio frame, 20 OFDM symbols totally.

In some embodiments, different from that the SSS in the existing LTE system uses a ZC sequence with a length being 31, the second synchronization signal uses a short ZC sequence, so that a receive-end device can maintain an advantage of autocorrelation performance when performing segmentation processing on the second synchronization signal.

In this embodiment, there are 12 available subcarriers in a frequency point in the power wireless communications system. Therefore, each of OFDM symbols that form the second synchronization signal may be generated in frequency domain based on a ZC sequence with a length being a prime number less than 12. For example, each OFDM symbol is generated in frequency domain based on a ZC sequence with a length being 11. An OFDM symbol may be generated according to a formula (2).

$$r_k(n) = e^{-j\pi\mu_k n(n+1)/N_{ZC}} \qquad (2)$$

In the formula (2), $r_k(n)$ represents an OFDM symbol numbered k, k=0, 1, 2, . . . , or 19, n=0, 1, 2, . . . , or $N_{FFT}-1$, $N_{FFT}$ is a size of an FFT, and $N_{ZC}$ is a length of a ZC sequence.

Further, in some embodiments, the second synchronization signal carries PCI information, or PCI information carried in the second synchronization signal is used to indicate a PCI of a current cell. The second device can determine the PCI of the current cell based on only the PCI information in the second synchronization signal.

Still further, to reduce complexity in searching for the second device, the second synchronization signal may include first PCI information and second PCI information.

The first PCI information indicates a first value, and the second PCI information indicates a second value. When receiving the second synchronization signal, the second device determines the PCI of the current cell based on a preset value combination rule, the first value, and the second value.

For example, the second synchronization signal includes 20 OFDM symbols. First 10 OFDM symbols are used to represent $N_{PCI}^{(1)}$ ($N_{PCI}^{(1)}=0, 1, 2, \ldots 19$), last 10 OFDM symbols are used to represent $N_{PCI}^{(2)}$ ($N_{PCI}^{(2)}=0, 1, 2, \ldots 19$), and the PCI of the current cell may be expressed as $20N_{PCI}^{(1)}+N_{PCI}^{(2)}$. An OFDM symbol may be generated according to a formula (3).

$$r_l(n) = e^{-j\pi\mu_l n(n+1)/N_{ZC}} \quad (3)$$

In the formula (3), $r_l(n)$ represents an OFDM symbol numbered l, l=0, 1, 2, ..., or 19, n=0, 1, 2, ..., or $N_{FFT}-1$, $N_{FFT}$ is a size of an FFT, and $N_{ZC}$ is a length of a ZC sequence. Correspondences among $N_{PCI}^{(1)}$, $N_{PCI}^{(2)}$, l, and $\mu_l$ are shown in Table 4.

TABLE 4

| $N_{PCI}^{(1)}$ or $N_{PCI}^{(2)}$ | lmod10 | | | | | | | | | |
|---|---|---|---|---|---|---|---|---|---|---|
| | 0 | 1 | 2 | 3 | 4 | 5 | 6 | 7 | 8 | 9 |
| | | | | | | $\mu_l$ | | | | |
| 0 | 3 | 1 | 4 | 9 | 10 | 6 | 8 | 7 | 5 | 2 |
| 1 | 8 | 4 | 1 | 10 | 6 | 2 | 7 | 3 | 5 | 9 |
| 2 | 6 | 4 | 5 | 7 | 9 | 1 | 2 | 8 | 10 | 3 |
| 3 | 3 | 10 | 9 | 8 | 1 | 4 | 6 | 2 | 7 | 5 |
| 4 | 9 | 5 | 8 | 2 | 1 | 7 | 3 | 4 | 6 | 10 |
| 5 | 1 | 10 | 4 | 7 | 2 | 3 | 5 | 9 | 8 | 6 |
| 6 | 2 | 3 | 6 | 10 | 8 | 7 | 4 | 9 | 1 | 5 |
| 7 | 5 | 6 | 7 | 1 | 3 | 9 | 10 | 4 | 2 | 8 |
| 8 | 5 | 2 | 10 | 3 | 9 | 6 | 7 | 1 | 8 | 4 |
| 9 | 8 | 1 | 10 | 4 | 3 | 5 | 9 | 2 | 6 | 7 |
| 10 | 10 | 7 | 2 | 5 | 1 | 3 | 9 | 6 | 4 | 8 |
| 11 | 6 | 5 | 2 | 9 | 7 | 10 | 4 | 3 | 8 | 1 |
| 12 | 2 | 4 | 3 | 1 | 5 | 8 | 6 | 7 | 9 | 10 |
| 13 | 7 | 9 | 6 | 8 | 4 | 3 | 2 | 1 | 5 | 10 |
| 14 | 9 | 10 | 7 | 6 | 5 | 2 | 8 | 1 | 4 | 3 |
| 15 | 7 | 2 | 8 | 9 | 3 | 4 | 1 | 5 | 10 | 6 |
| 16 | 9 | 8 | 5 | 1 | 4 | 10 | 7 | 2 | 3 | 6 |
| 17 | 4 | 3 | 1 | 6 | 9 | 8 | 5 | 10 | 2 | 7 |
| 18 | 4 | 9 | 8 | 3 | 7 | 5 | 10 | 6 | 1 | 2 |
| 19 | 8 | 3 | 5 | 2 | 10 | 9 | 1 | 6 | 7 | 4 |

Further, before sending the second synchronization signal, the first device performs precoding processing on the second synchronization signal, for example, performing orthogonal precoding processing, so that when the second synchronization signal is sent, space diversity can be obtained, and anti-fading performance can be improved.

For example, it is assumed that the first device has two antennas, and orthogonal precoding is performed on first 10 OFDM symbols and last 10 OFDM symbols of the second synchronization signal. In this case, corresponding precoding matrices are $$\frac{1}{\sqrt{2}}[1 \ 1]^T \text{ and } \frac{1}{\sqrt{2}}[1 \ -1]^T,$$

respectively.

In the foregoing embodiment, optionally, before sending the second synchronization signal, the first device performs scrambling processing on the second synchronization signal in frequency domain, for example, performing scrambling processing on the second synchronization signal by using a pseudonoise (PN) sequence, so that a PAPR of the system can be reduced, and anti-interference performance of the signal can be improved.

S107: The second device receives, on each group of subcarriers of the K groups of subcarriers, the second synchronization signal sent by the first device.

Specifically, in some embodiments, if the second device supports wideband reception, the second device may receive the second synchronization signal on each group of subcarriers of the K groups of subcarriers. If the second device does not support wideband reception, and the K groups of subcarriers used by the first device to send the second synchronization signal include the m groups of subcarriers used by the first device to send the first synchronization signal, the second device may search for the second synchronization signal on the m groups of subcarriers on which the first synchronization signal is received.

In other words, when frequency points used by the first device to send the second synchronization signal include frequency points used by the first device to send the first synchronization signal, the second device may receive the second synchronization signal on frequency points on which the first synchronization signal is received.

Figure 6:
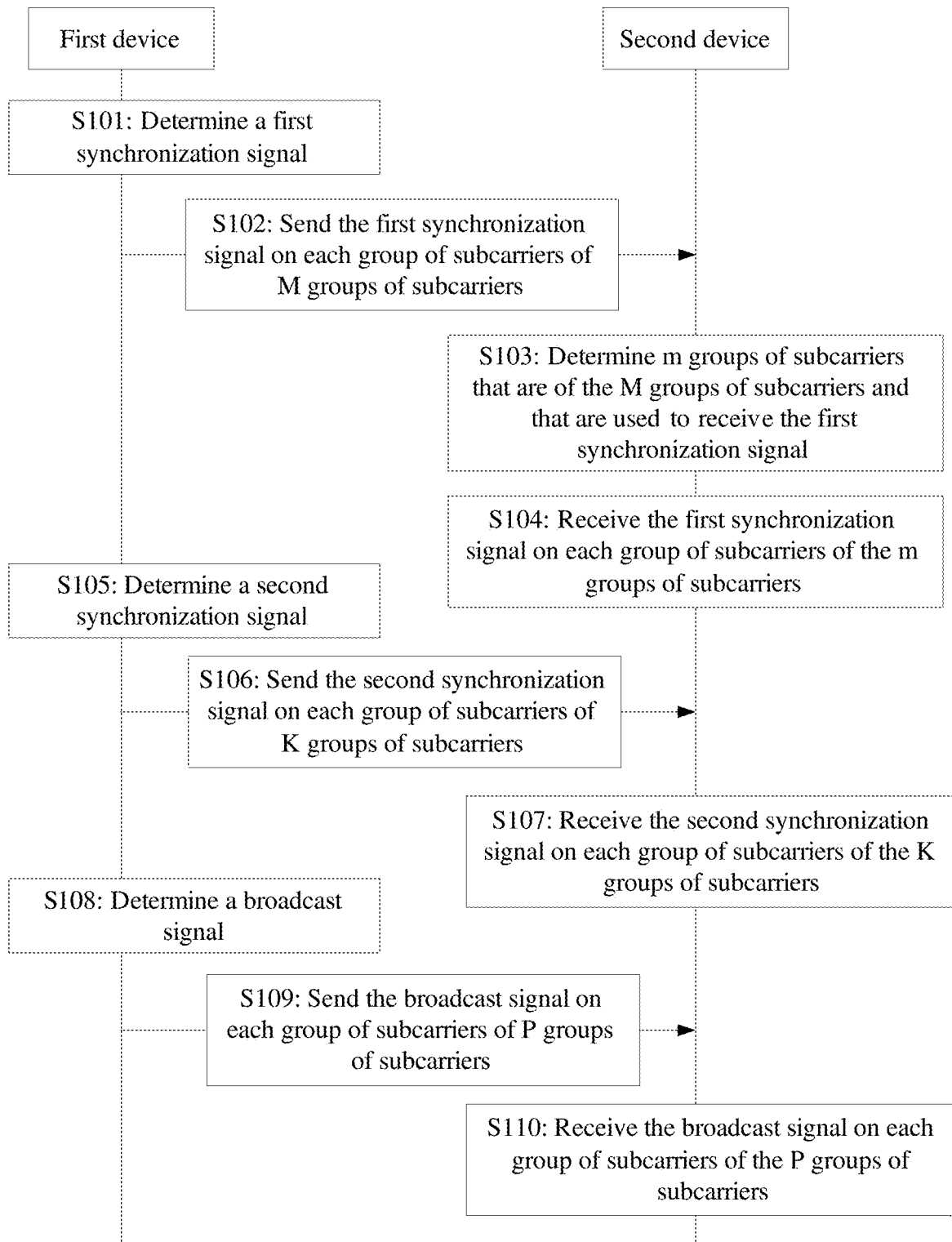
FIG. 6 is still another schematic flowchart of a communication method according to an embodiment.

In this embodiment, further, as shown in FIG. 6, the method 100 further includes the following steps.

S108: The first device determines a broadcast signal.

It should be noted that the broadcast signal in S108 may be corresponding to a system information block (SIB) message in the existing LTE system. The broadcast signal carries key system information such as a system frame number, so that the second device can obtain the key system information based on the broadcast signal.

S109: The first device sends the broadcast signal on each group of subcarriers of P groups of subcarriers, where P is a positive integer greater than or equal to 2.

Optionally, in S109, each group of subcarriers is corresponding to a frequency point in the power wireless communications system. In other words, for the power wireless communications system, the first device sends the broadcast signal on each of P frequency points, and totally sends P broadcast signals.

Optionally, the first device sends the broadcast signal on frequency points used to send the first synchronization signal. The first device sends the broadcast signal to the second device on a plurality of frequency points, thereby providing interference diversity and frequency domain diversity.

Specifically, in some embodiments, the first device determines, based on parameters such as a resource size of a subframe, a requirement for a coverage radius of a cell, and transmit power of the first device, time domain resources used to send the broadcast signal. For example, the time domain resources used to send the broadcast signal may be partial resources of a subframe, or may be resources of one or more subframes.

For example, as shown in FIG. 4, the time domain resources used to send the broadcast signal include nine subframes (subframe #6 to subframe #14) in one radio frame, 90 OFDM symbols totally.

Further, before the first device sends the broadcast signal, the first device performs orthogonal precoding processing on the broadcast signal. In a same RB, two orthogonal precoding matrices are used. In addition, adjacent REs use orthogonal precoding matrices.

S110: The second device receives the broadcast signal on each group of subcarriers of the P groups of subcarriers.

Specifically, in some embodiments, if the second device supports wideband reception, the second device may receive the broadcast signal on each group of subcarriers of the P groups of subcarriers. If the second device does not support wideband reception, and the P groups of subcarriers used by the first device to send the broadcast signal include the m groups of subcarriers used by the first device to send the first synchronization signal, the second device may search for the broadcast signal on the m groups of subcarriers on which the first synchronization signal is received.

In other words, when frequency points used by the first device to send the broadcast signal include frequency points used by the first device to send the first synchronization signal, the second device may receive the broadcast signal on frequency points on which the first synchronization signal is received.

In conclusion, the first device in this embodiment sends the first synchronization signal, the second synchronization signal, and the broadcast signal on each of a plurality of frequency points, and the second device may perform signal reception based on a capability of the second device. Therefore, the communication method in this embodiment can support both a wideband receiver and a narrowband receiver.

Figure 7:
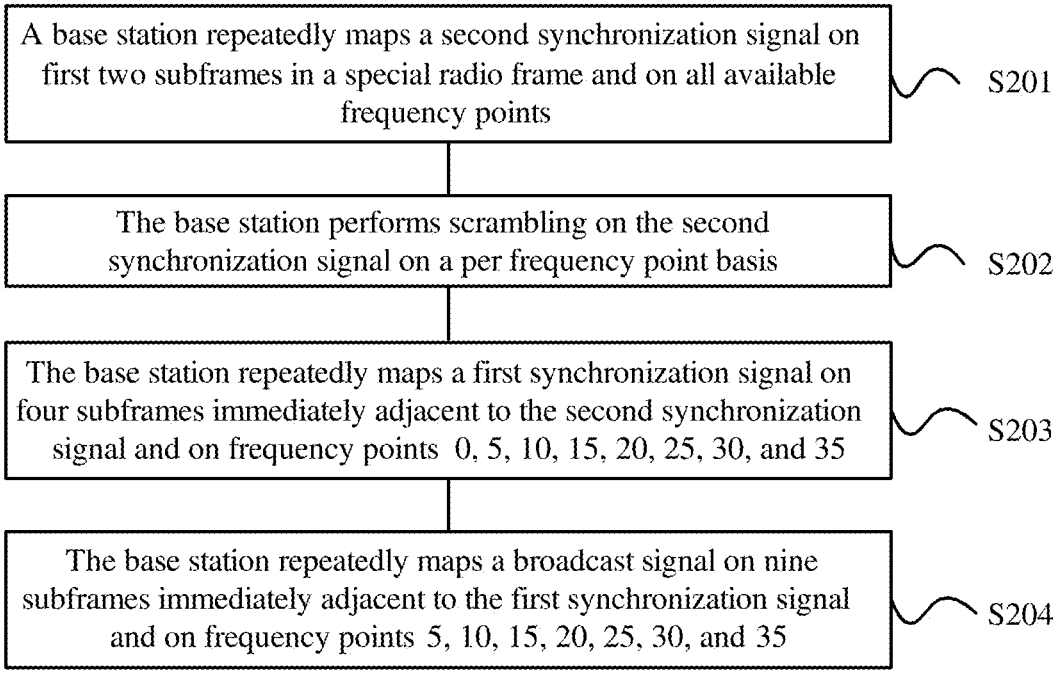
FIG. 7 is a schematic flowchart of a communication method according to another embodiment.

FIG. 7 is a schematic flowchart of a communication method according to a specific embodiment. For example, a communications system is a power system and a first device is a base station. The communication method is performed by the base station. The communication method 200 includes the following steps.

S201: A base station repeatedly maps a second synchronization signal on first two subframes in a special radio frame and on all available frequency points.

S202: The base station performs scrambling on the second synchronization signal on a per frequency point basis.

S203: The base station repeatedly maps a first synchronization signal on four subframes immediately adjacent to the second synchronization signal and on frequency points 0, 5, 10, 15, 20, 25, 30, and 35.

S204: The base station repeatedly maps a broadcast signal on nine subframes immediately adjacent to the first synchronization signal and on frequency points 5, 10, 15, 20, 25, 30, and 35.

Figure 8:
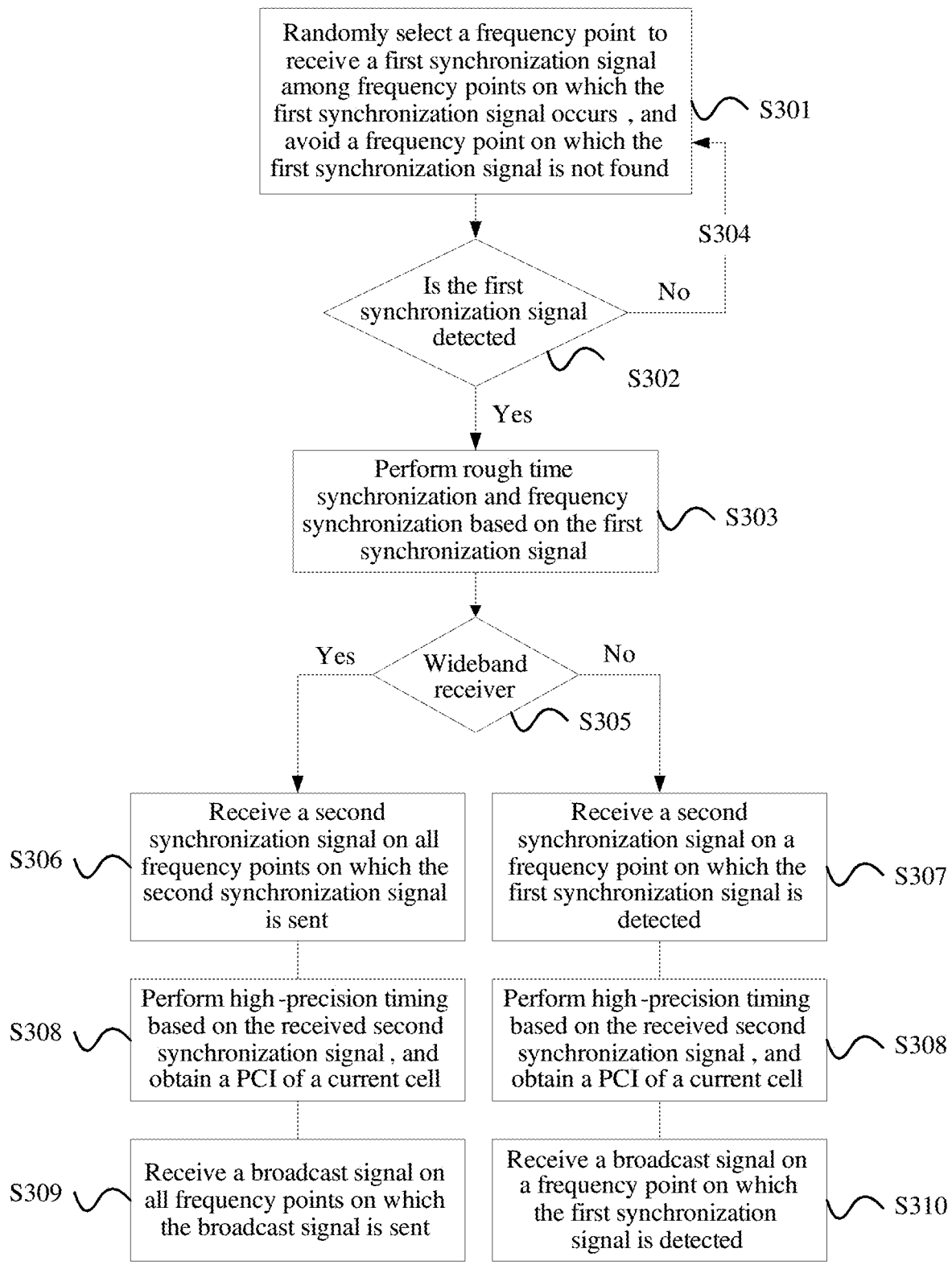
FIG. 8 is a schematic flowchart of a communication method corresponding to the communication method shown in FIG. 7.

Correspondingly, FIG. 8 is a schematic flowchart of a communication method corresponding to a communication method shown in FIG. 7. For example, a communications system is a power system and a second device is a terminal device. The communication method is performed by the terminal device. The communication method 300 includes the following steps.

S301: Randomly select a frequency point to receive a first synchronization signal among frequency points on which the first synchronization signal occurs, and avoid a frequency point on which the first synchronization signal is not found.

S302: Determine whether the first synchronization signal is detected on the selected frequency point.

S303: If the first synchronization signal is detected in S302, perform rough time synchronization and frequency synchronization based on the first synchronization signal.

S304: If the first synchronization signal is not detected in S302, return to S301.

S305: Determine whether a receiver is a wideband receiver.

S306: If it is determined in S305 that the receiver is a wideband receiver, receive a second synchronization signal on all frequency points on which the second synchronization signal is sent.

S307: If it is determined in S305 that the receiver is a narrowband receiver, receive a second synchronization signal on a frequency point on which the first synchronization signal is detected.

S308: Perform high-precision timing based on the received second synchronization signal, and obtain a PCI of a current cell.

S309: If it is determined in S305 that the receiver is a wideband receiver, receive a broadcast signal on all frequency points on which the broadcast signal is sent.

S310: If it is determined in S305 that the receiver is a narrowband receiver, receive a broadcast signal on a frequency point on which the first synchronization signal is detected.

Figure 9:
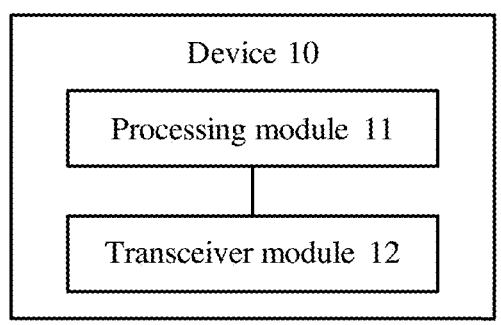
FIG. 9 is a schematic block diagram of a device according to an embodiment.

The foregoing describes the communication methods according to the embodiments in detail with reference to FIG. 3 to FIG. 8, and the following describes devices according to the embodiments in detail with reference to FIG. 9 to FIG. 12. As shown in FIG. 9, a device 10 includes: a processing module 11, configured to determine a first synchronization signal, where the first synchronization signal is used by a second device for symbol timing alignment and frequency synchronization; and a transceiver module 12, configured to send the first synchronization signal on each group of subcarriers of M groups of subcarriers, where M is a positive integer greater than or equal to 2.

Therefore, the device according to this embodiment sends the first synchronization signal on each group of subcarriers of a plurality of groups of subcarriers, so that the second device can select, based on a reception capability of the second device, an appropriate bandwidth to receive the first synchronization signal. In this way, a device with wideband reception performance and a device with narrowband reception performance can be supported. In addition, the device sends a plurality of first synchronization signals to the second device on the plurality of groups of subcarriers, so that interference diversity and frequency domain diversity can be provided, and first synchronization signal transmission reliability can be improved.

In this embodiment, optionally, the transceiver module 12 is configured to send, on each group of subcarriers of the M groups of subcarriers, the first synchronization signal to devices in all cells served by the device, where the devices in all the cells include the second device.

In this embodiment, optionally, the processing module 11 is configured to perform precoding processing on the first synchronization signal, to obtain a precoded first synchronization signal, where precoding matrices used by OFDM symbols included in the first synchronization signal are not exactly the same.

In this embodiment, optionally, the processing module 11 is further configured to determine a second synchronization signal, where the second synchronization signal is used by the second device for frame timing alignment; and the transceiver module 12 is further configured to send the second synchronization signal on each group of subcarriers of K groups of subcarriers, where K is a positive integer greater than or equal to 2.

In this embodiment, optionally, the second synchronization signal is further used to indicate a physical cell identifier PCI of a current cell.

In this embodiment, optionally, the second synchronization signal includes first PCI information and second PCI information, the first PCI information is used to indicate a first value, the second PCI information is used to indicate a second value, and the processing module 11 is further configured to determine the first PCI information and the second PCI information based on a preset value combination rule and the PCI of the current cell.

In this embodiment, optionally, the processing module 11 is further configured to perform precoding processing on the second synchronization signal, to obtain a precoded second synchronization signal, where precoding matrices used by OFDM symbols included in the second synchronization signal are not exactly the same.

In this embodiment, optionally, the processing module 11 is further configured to perform scrambling processing on the second synchronization signal, to obtain a scrambled second synchronization signal.

In this embodiment, optionally, the processing module 11 is further configured to determine a broadcast signal, and the transceiver module 12 is further configured to send the broadcast signal on each group of carriers of P groups of subcarriers, where P is a positive integer greater than or equal to 2.

It should be understood that the device 10 in this embodiment is embodied in a form of a functional unit. In an optional example, a person skilled in the art may understand that the device 10 may be corresponding to the first devices in the foregoing some embodiments and may be used to execute each process and/or step corresponding to the first devices in the foregoing method embodiments. To avoid repetition, no details are described herein again.

Specifically, in this embodiment, the processing module 11 may be implemented by a processor, and the transceiver module 12 may be implemented by a transceiver. It should be understood that the transceiver may be a device with both a reception function and a sending function, or may be a device combined by a receiving component with a reception function and a sending component with a sending function.

Figure 10:
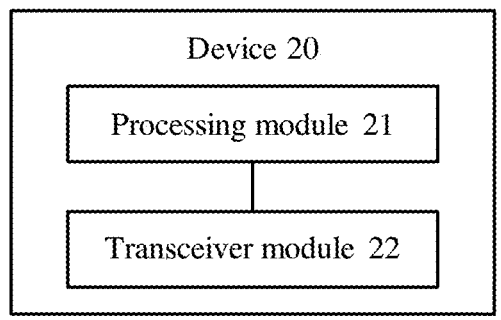
FIG. 10 is a schematic block diagram of a device according to another embodiment.

FIG. 10 shows a device according to another embodiment. As shown in FIG. 10, a device 20 includes: a processing module 21, configured to determine m groups of subcarriers that are of M groups of subcarriers and that are used to receive a first synchronization signal sent by a first device, where M is a positive integer greater than or equal to 2, and m is a positive integer less than M; and a transceiver module 22, configured to receive the first synchronization signal on each group of subcarriers of the m groups of subcarriers.

Therefore, the device according to this embodiment selects subcarriers used to receive the first synchronization signal from a plurality of groups of subcarriers used by the first device to send the first synchronization signal. In this way, the device can receive the first synchronization signal on a relatively narrow bandwidth, to avoid an impact of time drift on the first synchronization signal.

In this embodiment, optionally, the M groups of subcarriers are subcarriers used by the first device to send the first synchronization signal to devices in all cells served by the first device, and the devices in all the cells include the device.

In this embodiment, optionally, the first synchronization signal has been precoded by the first device, and precoding matrices used by OFDM symbols included in the first synchronization signal are not exactly the same.

In this embodiment, optionally, after the device performs symbol timing alignment and frequency synchronization based on the first synchronization signal, the transceiver module 22 is further configured to receive, on each group of subcarriers of K groups of subcarriers, a second synchronization signal sent by the first device, where K is a positive integer greater than or equal to 2.

In this embodiment, optionally, the K groups of subcarriers include the m groups of subcarriers; and the transceiver module 22 is configured to receive, on each group of subcarriers of the m groups of subcarriers, the second synchronization signal sent by the first device.

In this embodiment, optionally, the second synchronization signal is further used to indicate a physical cell identifier PCI of a current cell, and the processing module 21 is further configured to: determine the PCI of the current cell based on the second synchronization signal.

In this embodiment, optionally, the second synchronization signal includes first PCI information and second PCI information, the first PCI information is used to indicate a first value, and the second PCI information is used to indicate a second value; and the processing module 21 is configured to determine the PCI of the current cell based on a preset value combination rule and the first value and the second value.

In this embodiment, optionally, the second synchronization signal has been precoded by the first device, and precoding matrices used by OFDM symbols included in the second synchronization signal are not exactly the same.

In this embodiment, optionally, the second synchronization signal has been scrambled by the first device. In this embodiment, optionally, after the second device performs frame timing alignment based on the second synchronization signal, the transceiver module 22 is further configured to receive a broadcast signal on each group of subcarriers of P groups of subcarriers, where P is a positive integer greater than or equal to 2.

In this embodiment, optionally, the P groups of subcarriers include the m groups of subcarriers; and the transceiver module 22 is configured to receive the broadcast signal on the m groups of subcarriers.

It should be understood that the device 20 in this embodiment is embodied in a form of a functional unit. In an optional example, a person skilled in the art may understand that the device 20 may be corresponding to the second devices in the foregoing some embodiments and may be used to execute each process and/or step corresponding to the second devices in the foregoing method embodiments. To avoid repetition, no details are described herein again.

Specifically, in this embodiment, the processing module 21 may be implemented by a processor, and the transceiver module 22 may be implemented by a transceiver. It should be understood that the transceiver may be a device with both a reception function and a sending function, or may be a device combined by a receiving component with a reception function and a sending component with a sending function.

Figure 11:
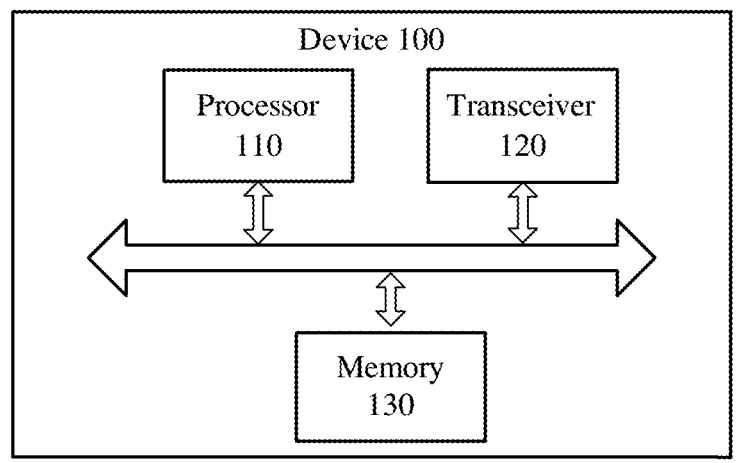
FIG. 11 is a schematic block diagram of a device according to still another embodiment.

FIG. 11 shows a device according to still another embodiment. As shown in FIG. 11, a device 100 includes a processor 110 and a transceiver 120. The processor 110 is connected to the transceiver 120. Optionally, the network device 100 further includes a memory 130. The memory 130 is connected to the processor 110. The processor 110, the memory 130, and the transceiver 120 may communicate with each other by using an internal connection channel. The processor 110 is configured to determine a first synchronization signal, where the first synchronization signal is used by a second device for symbol timing alignment and frequency synchronization. The transceiver 120 is configured to send the first synchronization signal on each group of subcarriers of M groups of subcarriers, where M is a positive integer greater than or equal to 2.

Therefore, the device according to this embodiment sends the first synchronization signal on each group of subcarriers of a plurality of groups of subcarriers, so that the second device can select, based on a reception capability of the second device, an appropriate bandwidth to receive the first synchronization signal. In this way, a device with wideband reception performance and a device with narrowband reception performance can be supported. In addition, the device sends a plurality of first synchronization signals to the second device on the plurality of groups of subcarriers, so that interference diversity and frequency domain diversity can be provided, and first synchronization signal transmission reliability can be improved.

The device 100 according to this embodiment may be corresponding to the device 10 according to the embodiment. In addition, units/modules in the network device and the foregoing other operations and/or functions are intended to implement corresponding procedures in the foregoing methods. For brevity, details are not described herein again.

Figure 12:
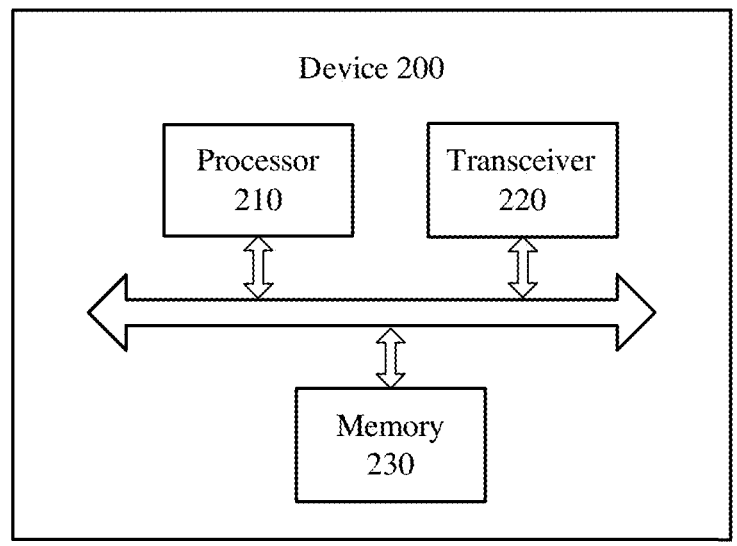
FIG. 12 is a schematic block diagram of a device according to still another embodiment.

FIG. 12 is a schematic block diagram of a device according to still another embodiment. As shown in FIG. 12, a device 200 includes a processor 210 and a transceiver 220. The processor 210 is connected to the transceiver 220. Optionally, the terminal device 200 further includes a memory 230. The memory 230 is connected to the processor 210. The processor 210, the memory 230, and the transceiver 220 may communicate with each other by using an internal connection channel. The processor 210 is configured to determine m groups of subcarriers that are of M groups of subcarriers and that are used to receive a first synchronization signal sent by a first device, where M is a positive integer greater than or equal to 2, and m is a positive integer less than M. The transceiver 220 is configured to receive the first synchronization signal on each group of subcarriers of the m groups of subcarriers.

Therefore, the device according to this embodiment selects subcarriers used to receive the first synchronization signal from a plurality of groups of subcarriers used by the first device to send the first synchronization signal. In this way, the device can receive the first synchronization signal on a relatively narrow bandwidth, to avoid an impact of time drift on the first synchronization signal.

The device 200 according to this embodiment may be corresponding to the device 20 according to the embodiment. In addition, units/modules in the device and the foregoing other operations and/or functions are intended to implement corresponding procedures in the foregoing methods. For brevity, details are not described herein again.

It may be understood that the processors in the embodiments may be an integrated circuit chip and has a signal processing capability. The foregoing processors may be a general purpose processor, a digital signal processor (DSP), an application-specific integrated circuit (ASIC), a field-programmable gate array (FPGA) or another programmable logic device, a discrete gate or transistor logic device, or a discrete hardware component, and can implement or execute the methods, steps, and logical block diagrams disclosed in the embodiments. The general purpose processor may be a microprocessor, or the processor may be any conventional processor or the like.

The memories in the embodiments may be a volatile memory or a nonvolatile memory, or may include a volatile memory and a nonvolatile memory. The nonvolatile memory may be a read-only memory (ROM), a programmable read-only memory (PROM), an erasable programmable ROM (EPROM), an electrically erasable EPROM (EEPROM), or a flash memory. The volatile memory may be a random-access memory (RAM), used as an external cache. By way of example but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (Enhanced SDRAM, ESDRAM), a synchronous link DRAM (SLDRAM), and a Direct Rambus DRAM (DR DRAM). It should be noted that the memories of the systems and methods described in this specification include but are not limited to these and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for detailed working processes of the foregoing described system, apparatus, and unit, reference may be made to corresponding processes in the foregoing method embodiments, and details are not described herein again.

In the several embodiments provided, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments. The foregoing storage medium includes: any medium that can store program code, such as a Universal Serial Bus (USB) flash drive, a removable hard disk, a ROM, a RAM, a magnetic disk, or an optical disc.

The foregoing descriptions are merely specific implementations, but are not intended to limit the protection scope of this disclosure. Any variation or replacement readily figured out by a person skilled in the art within the technical scope disclosed shall fall within the protection scope of this disclosure.

What is claimed is:

1. A communication method comprising:
   determining, by a second device, first groups of subcarriers from among second groups of subcarriers;
   receiving, by the second device and from a first device, a first synchronization signal on the first groups of subcarriers;
   performing, by the second device, symbol timing alignment and frequency synchronization using the first synchronization signal; and
   receiving, by the second device, from the first device, and after performing the symbol timing alignment and the frequency synchronization, a second synchronization signal on third groups of subcarriers,
   wherein the third groups of subcarriers comprise the first groups of subcarriers.

2. The communication method of claim 1, further comprising:
   serving, by the first device, a plurality of cells; and
   using, by the first device, the second groups of subcarriers to send the first synchronization signal to devices in the plurality of cells, wherein the devices comprise the second device.

3. The communication method of claim 1, further comprising precoding, by the first device, the first synchronization signal, wherein the first synchronization signal comprises orthogonal frequency-division multiplexing (OFDM) symbols, and wherein the OFDM symbols use precoding matrices.

4. The communication method of claim 1, wherein the second synchronization signal indicates a physical cell identifier (PCI) of a current cell, and wherein the communication method further comprises determining, by the second device, the PCI based on the second synchronization signal.

5. The communication method of claim 4, wherein the second synchronization signal comprises first PCI information and second PCI information, wherein the first PCI information indicates a first value, wherein the second PCI information indicates a second value, and wherein the communication method further comprises further determining, by the second device, the PCI based on a preset value combination rule, the first value, and the second value.

6. The communication method of claim 1, further comprising precoding, by the first device, the second synchronization signal, wherein the second synchronization signal comprises orthogonal frequency-division multiplexing (OFDM) symbols, and wherein the OFDM symbols use precoding matrices.

7. The communication method of claim 1, further comprising:
   performing, by the second device, frame timing alignment based on the second synchronization signal; and
   receiving, by the second device after performing the frame timing alignment, a broadcast signal on fourth groups of subcarriers.

8. A communications system comprising:
   a first device; and
   a second device configured to:
      determine first groups of subcarriers from among second groups of subcarriers;
      receive, from the first device, a first synchronization signal on the first groups of subcarriers;
      perform symbol timing alignment and frequency synchronization using the first synchronization signal;
      receive, from the first device and after performing the symbol timing alignment and the frequency synchronization, a second synchronization signal on third groups of subcarriers;
      perform frame timing alignment based on the second synchronization signal; and
      receive, after performing the frame timing alignment, a broadcast signal on fourth group of subcarriers.

9. The communications system of claim 8, wherein the first device is configured to:
   serve a plurality of cells; and
   use the second groups of subcarriers to send the first synchronization signal to devices in the plurality of cells, where the devices comprise the second device.

10. The communications system of claim 8, wherein the first device is configured to precode the first synchronization signal, wherein the first synchronization signal comprises orthogonal frequency-division multiplexing (OFDM) symbols, and wherein the OFDM symbols use precoding matrices.

11. The communications system of claim 8, wherein the third groups of subcarriers comprise the first groups of subcarriers.

12. The communications system of claim 8, wherein the second synchronization signal indicates a physical cell identifier (PCI) of a current cell, and wherein the second device is further configured to determine the PCI based on the second synchronization signal.

13. The communications system of claim 12, wherein the second synchronization signal comprises first PCI information and second PCI information, wherein the first PCI information indicates a first value, wherein the second PCI information indicates a second value, and wherein the second device is further configured to determine the PCI based on a preset value combination rule, the first value, and the second value.

14. The communications system of claim 8, wherein the first device is configured to precode the second synchronization signal, wherein the second synchronization signal comprises orthogonal frequency-division multiplexing (OFDM) symbols, and wherein the OFDM symbols use precoding matrices.

15. A second device comprising:
   a processor configured to determine first groups of subcarriers from among second groups of subcarriers; and
   a transceiver coupled to the processor and configured to receive, from a first device, a first synchronization signal on the first groups of subcarriers,
   wherein the processor is further configured to perform symbol timing alignment and frequency synchronization using the first synchronization signal,
   wherein the transceiver is further configured to receive a second synchronization signal,
   wherein the processor is further configured to perform frame timing alignment based on the second synchronization signal, and
   wherein the transceiver is further configured to receive, after the processor performs frame timing alignment, a broadcast signal on fourth groups of subcarriers.

16. The second device of claim 15, wherein the first synchronization signal is precoded, wherein the first synchronization signal comprises orthogonal frequency-division multiplexing (OFDM) symbols, and wherein the OFDM symbols use precoding matrices.

17. The second device of claim 15, wherein the transceiver is further configured to further receive the second synchronization signal on third groups of subcarriers.

18. The second device of claim 17, wherein the third groups of subcarriers comprise the first groups of subcarriers.

19. The second device of claim 15, wherein the second synchronization signal indicates a physical cell identifier (PCI) of a current cell, and wherein the processor is further configured to determine the PCI based on the second synchronization signal.

20. The second device of claim 19, wherein the second synchronization signal comprises first PCI information and second PCI information, wherein the first PCI information indicates a first value, wherein the second PCI information indicates a second value, and wherein the processor is further configured to determine the PCI based on a preset value combination rule, the first value, and the second value.

* * * * *